United States Patent [19]
Born

[11] Patent Number: 4,974,721
[45] Date of Patent: Dec. 4, 1990

[54] METHOD AND ARRANGEMENT FOR CONVERTING A SINGLE-ROW STREAM OF CONTAINERS INTO A MULTI-ROW STREAM OF CONTAINERS

[75] Inventor: Gerhard Born, Bingen, Fed. Rep. of Germany

[73] Assignee: SEITZ ENZINGER NOLL Maschinenbau/Aktiengesellschaft, Mannheim, Fed. Rep. of Germany

[21] Appl. No.: 375,252

[22] Filed: Jun. 30, 1989

[30] Foreign Application Priority Data

Jul. 8, 1988 [DE] Fed. Rep. of Germany ....... 3823228

[51] Int. Cl.⁵ ............................................. B65G 47/26
[52] U.S. Cl. ..................................... 198/434; 198/436
[58] Field of Search ............... 198/434, 436, 443, 445, 198/461, 462, 579

[56] References Cited

U.S. PATENT DOCUMENTS

| | | | |
|---|---|---|---|
| 3,665,863 | 5/1972 | Patin | 198/579 |
| 4,162,722 | 7/1979 | Early | 198/434 |
| 4,496,040 | 1/1985 | Kronseder et al. | 198/436 |

FOREIGN PATENT DOCUMENTS

145020 7/1986 Japan ..................................... 198/461

*Primary Examiner*—Joseph E. Valenza
*Attorney, Agent, or Firm*—Robert W. Becker & Associates

[57] ABSTRACT

A method and arrangement for converting a single-row stream of containers, which is supplied via a feed mechanism, into a multi-row stream of containers that is to be withdrawn. A conversion region is used that is formed from an intermediate transport mechanism that is disposed between the feed mechanism and a withdrawal mechanism, and comprises a number of conveyor belts that have a common direction of transport. In the conversion region, the transport speed of the containers is reduced in stages while the width of the stream of containers increases. To effect conversion of the single-row stream of containers that is supplied from itself into the multi-row stream of containers without the influence of external jamming forces upon the containers, the containers are moved through the conversion region in the direction of transport of the conveyer belts, and the transport speed of the containers is reduced by stages in this direction of transport.

18 Claims, 3 Drawing Sheets

METHOD AND ARRANGEMENT FOR CONVERTING A SINGLE-ROW STREAM OF CONTAINERS INTO A MULTI-ROW STREAM OF CONTAINERS

BACKGROUND OF THE INVENTION

The present invention relates to a method and arrangement for converting a single-row stream of containers, especially bottles, which stream is supplied via a feed mechanism, into a multi-row stream of containers that is to be withdrawn.

One known arrangement for converting a single-row stream of bottles into a multi-row stream of bottles (German Offenlegungsschrift No. 35 05 253—Lorenz dated Aug. 21, 1986 and belonging to the assignee of the present invention) is provided with an intermediate transport means that comprises two transport sections, each of which is formed by a plurality of laterally abutting conveyer belts. The transport sections, in turn, also laterally, i.e. perpendicular to the direction of transport or rotation of these conveyer belts, abut one another. The entrance of the intermediate transport means is formed from one conveyer belt of one of the two transport sections, which conveyer belt is provided on one side of the intermediate transport means, whereas the conveyer belts of the other transport section, which conveyer belts are provided on the opposite side of the intermediate transport means, form the outlet of the intermediate transport means of this known arrangement. With the aid of guide rails, which are spaced increasingly far apart from the entrance to the outlet of the intermediate transport means and thereby form a passage for the bottles that widens from the entrance to the outlet, the supplied stream of bottles, in order to produce the multi-stream of bottles that is to be withdrawn, is moved diagonally, i.e. at an angle to the direction of rotation of the conveyer belts, through the intermediate transport means that is formed by these conveyer belts. One drawback of this heretofore known arrangement is that during conversion into the multi-row stream, the bottles slide against one another as well as against the guide rails; in other words, the conversion is therefore brought about by the effect of backup or jamming forces.

It is an object of the present invention to provide a method and arrangement with which the conversion of a single-row stream of containers into a multi-row stream of containers can be effected without external influence from guide rails or similar guide means for the containers.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The inventive method concerns converting a single-row stream of bottles or other containers, which stream is supplied via a feed mechanism, into a multi-row stream of containers that is to be withdrawn. The method utilizes a conversion region formed from an intermediate transport means that is disposed between the feed mechanism and a withdrawal mechanism, and comprises a number of conveying means that have a common direction of transport. The transport speed of the containers in the conversion region is reduced in stages while the width of the stream of containers is increasing. The method is characterized by the steps of moving the containers through the conversion region in the direction of transport of the conveying means, and reducing the transport speed of the bottles by stages in this direction of transport.

In an apparatus for converting a single-row stream of containers, which is supplied via a feed mechanism, into a multi-row stream of containers, which is to be withdrawn via a withdrawal mechanism that has a transport speed that is less than the transport speed of the feed mechanism. The arrangement includes an intermediate transport means that is disposed between the feed mechanism and the withdrawal mechanism and forms a conversion region for the conversion of the single-row stream of containers into the multi-row stream of containers. The intermediate transport means has an entrance that follows the feed mechanism or a connecting zone that is disposed between the feed mechanism and the intermediate transport means. The intermediate transport means also has an outlet to which the withdrawal mechanism is connected. The intermediate transport means is provided with a number of transport sections on which bases of the containers stand. The transport sections are formed from continuous rotating conveyer belts which, relative to their direction of rotation or transport, each have a front or upstream end, which is delimited by a respective turn-around or direction-changing means at that location, and also have a rear or downstream end, which is similarly delimited by a respective direction-changing means. Accordingly at least a first transport section forms the entrance of the intermediate transport means, the upstream and downstream ends of the conveyer belts of the transport sections being offset relative to one another in the direction of transport of the belts. The transport sections laterally abut one another in a direction transverse to the direction of transport. The conveyer belts of the transport sections have different rotational or transport speeds in order to bridge, in stages, the difference between the transport speeds of the feed mechanism and the withdrawal mechanism. The apparatus is characterized primarily in that: all of the transport sections have a conveyer belt that extends to the outlet of the intermediate transport means; the first transport section, as well as all further transport sections disposed laterally of said first transport section, with the exception, on each side of the first transport section, of the outermost transport section, have at least two conveyer belts that in a given transport section follow one another in the direction of transport via the interposition of respective transition zones; at least in the conversion region of the intermediate transport means, that conveyer belt that follows a transition zone of a given transport section in the direction of transport has a lower transport speed than does that conveyer belt of this transport section that immediately precedes this transition zone in the direction of transport; at least in the conversion region of the intermediate transport means, disposed adjacent to each transition zone of one transport section is a conveyer belt of a laterally abutting transport section, with this conveyer belt overlapping this transition zone; and the width of each of the conveyer belts that form the transport sections of the intermediate transport means, as measured at right angles to the direction of transport, is less than the diameter of the bases of the containers.

The apparatus of the present invention can also be characterized in that the conveying means are each formed by at least one group of rollers that in each group follow one another in the direction of transport, with the rollers of one group having a different speed from the rollers of another group such that the containers are moved through the conversion region in the direction of transport of the conveying means, and the transport speed of the containers in this direction of transport is reduced by stages.

With the inventive method and arrangement, the single-row stream of containers that is supplied is converted into the multi-row stream of containers that is to be withdrawn accompanied by uniform and gradual deceleration without external influence from guide rails or similar guide means. During this conversion, the supplied stream of containers, so to speak from itself, spreads out transverse to the direction of transport or rotation of the transport elements, which are the conveyer belts or the groups of rollers, whereby the containers rest against one another, so that a quiet conversion is achieved that is particularly gentle to the containers. A critical point of the present invention is that the direction of rotation and transport of the conveyer belts is the same as the direction of transport in which the containers move through the intermediate transport means, i.e. the conversion region that is formed there, and that accordingly the stagewise reduction of the transport speed of the containers is effected in this direction of transport.

Further specific features of the present invention will be described in detail subsequently.

DESCRIPTION OF PREFERRED EMBODIMENTS

Figure 1:
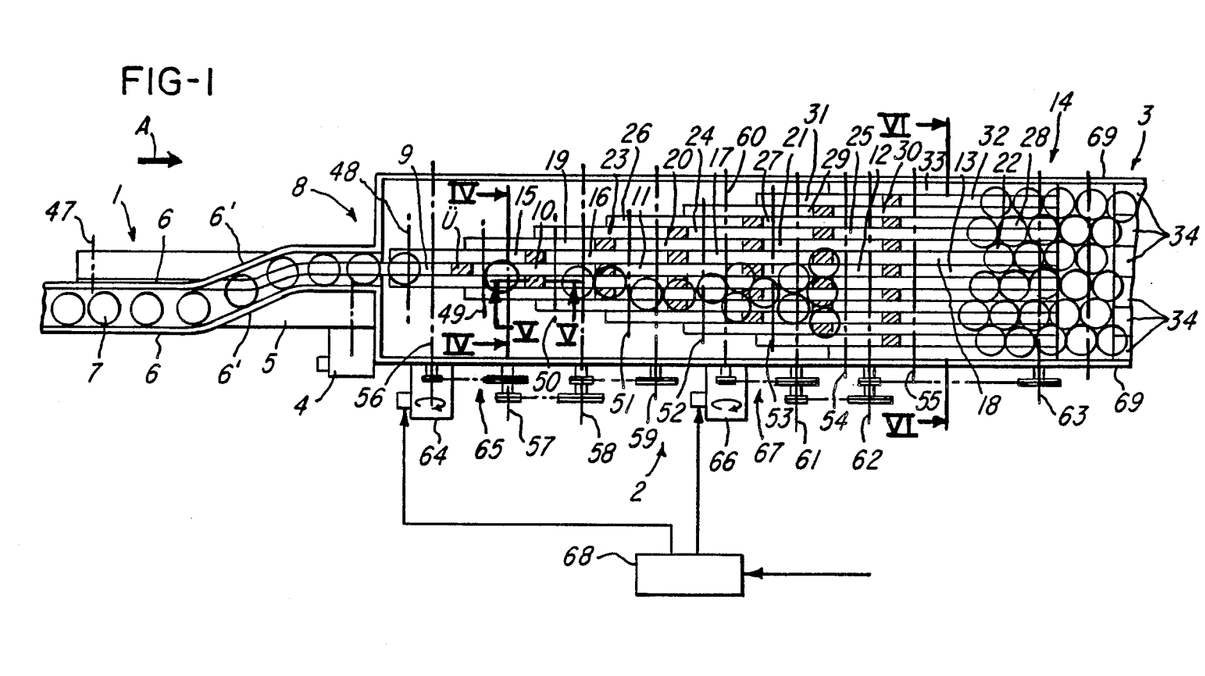
FIG. 1 is a simplified plan view of a first exemplary embodiment of the inventive arrangement for converting a single-row stream of bottles into a multi-row stream of bottles, together with a number of bottles.

Referring now to the drawings in detail, and in particular to FIG. 1, the illustrated arrangement for converting a supplied, single-row stream of bottles into a withdrawn, multi-row stream of bottles, i.e. six tracks or rows in the illustrated embodiment, essentially comprises the feed mechanism 1 for supplying the single-row stream of bottles, the intermediate transport means 2 that forms the conversion zone for converting the single-row stream of bottles into the multi-row stream of bottles, as well as the withdrawal mechanism 3 for withdrawing the multi-row stream of bottles.

In the embodiment illustrated in FIG. 1, the feed mechanism 1 is essentially formed from a continuous conveyer belt 5, which is continuously rotated by a drive means 4, such as a drive motor, as well as two guide rails 6 that laterally delimit the track or conveying width of the feed mechanism 1. The distance between the two guide rails 6, and hence the track or conveying width of the feed mechanism 1, is such that the bottles 7 are fed to the arrangement from a non-illustrated bottle processing machine, for example a labelling machine, etc., via the feed mechanism 1 in the direction of the arrow A as a single-row stream of bottles in which the upright bottles 7, which have their bases 7' resting upon the conveyer belt 5, are successively provided in the direction of transport A. At the connecting zone 8 between the feed mechanism 1 and intermediate transport means 2, the two guide rails 6 have an S-shaped orientation at 6' of such a configuration that at that location the bottles 7 are progressively pushed laterally from the conveyer belt 5 onto a curved-path conveyer belt 9 and are then in turn conveyed to the intermediate transport means 2 by this conveyer belt 9 in the direction of transport A. The conveyer belt 9, which is already a part of the intermediate transport means 2 and, counter to the direction of transport A, extends over the entrance of the intermediate transport means 2, i.e. over the connecting zone 8, is provided in this connecting zone 8, in conformity with the orientation of the guide rails 6 at that location, an S-shaped orientation such that the conveyer belt 9 approaches the conveyer belt 5, with a forward or upstream end of the conveyer belt 9 (in the direction of transport A still ahead of the connecting zone 8) resting directly next to a longitudinal side of the conveyer belt 5.

In the intermediate transport means 2, in the direction of transport A, a conveyer belt 10 is connected to the conveyer belt 9, a conveyer belt 11 is connected to the conveyer belt 10, a conveyer belt 12 is connected to the conveyer belt 11, and a conveyer belt 13 is connected to the conveyer belt 2, in each case via a transition zone Ü. These conveyer belts form a first transport section of the intermediate transport means 2, which transport section, in the embodiment of FIG. 1, extends in the center line of the intermediate transport means 2 and the withdrawal mechanism 3, this center line extending in the direction of transport A. In particular, the first transport section extends from the connecting zone 8, i.e. the entrance to the intermediate transport means 2, to the outlet 14 thereof where the withdrawal mechanism 3 is connected to the intermediate transport means 2. To better highlight them, also the transition zones Ü of the other transport sections, which will be described subsequently, are shown crosshatched in FIG. 1.

Disposed symmetrically to the aforementioned center line are further transport sections on both sides of the first transport section of the intermediate transport means 2, which first transport section is formed from the conveyer belts 9-13. In particular, in the illustrated embodiment, provided on both sides of the first transport section formed from the conveyer belts 9-13 are the following further transport sections, which are similarly formed from conveyer belts and extend to the outlet 14:

1. Disposed directly to the side, i.e. perpendicular to the direction of transport A, of the first transport section formed by the conveyer belts 9-15 is a second transport section formed from the conveyer belts 15-18, one longitudinal side of each of which is directly adjacent one or more of the conveyer belts 9-13 of the first transport section. In the second transport section, in the direction of transport A, the conveyer belt 16 follows the conveyer belt 15, the conveyer belt 17 follows the conveyer belt 16, and the conveyer belt 18 follows the conveyer belt 17, with the conveyer belt 18, just like the conveyer belt 13, extending to the outlet 14 of the intermediate transport means 2.

The conveyer belts 15-18 of this second transport section have such a length and are offset in the direction of transport A relative to the conveyer belts 9-13 of the adjacent first transport section in such a way that the front or upstream end (relative to the direction of transport A) of the conveyer belt 15 extends into the vicinity of the entrance of the intermediate transport means 2, while the rear or downstream end of the conveyer belt 15 extends beyond (again in the direction of transport A) the transition zone Ü between the conveyer belts 9 and 10 and hence overlaps this transition zone between the conveyer belts 9 and 10. In a similar manner, the conveyer belt 16 overlaps the transition zone Ü between the conveyer belts 10 and 11, the conveyer belt 17 overlaps the transition zone Ü between the conveyer belts 11 and 12, and the conveyer belt 18 overlaps the transition zone Ü between the conveyer belts 12 and 13.

2. A third transport section formed from the conveyer belts 19-22 is disposed immediately to the side of the second transport section formed by the conveyer belts 15-18. One longitudinal side of each of the conveyer belts 19-22 is disposed directly adjacent at least one of the conveyer belts 15-18 of the second transport section. In the direction of transport A, the conveyer belt 20 follows the conveyer belt 19, the conveyer belt 21 follows the conveyer belt 20, and the conveyer belt 22 follows the conveyer belt 21, with the conveyer belt 22 extending to the outlet 14 of the intermediate transport means 2.

The conveyer belts 19-22 of this third transport section have such a length and are offset relative to the conveyer belts 15-18 of the adjacent second transport section in such a way that the front end (relative to the direction of transport A) of the conveyer belt 19 extends to approximately the middle of the adjacent conveyer belt 15, while the rear end of the conveyer belt 19 extends beyond (again in the direction of transport A) the transition zone Ü between the conveyer belts 15 and 16, is disposed approximately in the center of the conveyer belt 16, and hence overlaps the transition zone Ü between the conveyer belts 15 and 16. In a similar manner, the conveyer belt 20 overlaps the transition zone Ü between the conveyer belts 16 and 17, the conveyer belt 21 overlaps the transition zone Ü between the conveyer belts 17 and 18, while the transition zone Ü between the conveyer belts 21 and 22 is overlapped by the conveyer belt 18, the front end of which is disposed approximately in the vicinity of the middle of the conveyer belt 21.

3. A fourth transport section, formed by the conveyer belts 23-25, is disposed directly to the side of the third transport section formed by the conveyer belts 19-22. One longitudinal side of each of the conveyer belts 23-25 is disposed directly adjacent at least one of the conveyer belts 19-22 of the third transport section. In the direction of transport A, the conveyer belt 24 follows the conveyer belt 23, and the conveyer belt 25 follows the conveyer belt 24, with the conveyer belt 25 extending to the outlet 14 of the intermediate transport means 2.

The conveyer belts 23-25 of this fourth transport section have such a length and are offset in the direction of transport A relative to the conveyer belts 19-22 of the adjacent third transport section in such a way that the front end (relative to the direction of transport A) of the conveyer belt 23 extends to approximately the center of the conveyer belt 19, while the rear end of this conveyer belt 23 (again relative to the direction of transport A) extends beyond the transition zone Ü between the conveyer belts 19 and 20 and thus overlaps this transition zone Ü between the conveyer belts 19 and 20. In a similar manner, the conveyer belt 24 overlaps the transition zone Ü between the conveyer belts 20 and 21, and the conveyer belt 25 overlaps the transition zone Ü between the conveyer belts 21 and 22.

4. A fifth transport section, formed by the conveyer belts 26-28, is disposed directly to the side of the fourth transport section formed from the conveyer belts 23-25. One longitudinal side of each of the conveyer belts 26-28 is disposed directly adjacent at least one of the conveyer belts 23-25 of the fourth transport section. In the direction of transport A, the conveyer belt 27 follows the conveyer belt 26, and the conveyer belt 28 follows the conveyer belt 27, with the conveyer belt 28 again extending to the outlet 14 of the intermediate transport means 2.

The conveyer belts 26-28 of this fifth transport section have such a length and are offset in the direction of transport A relative to the conveyer belts 23-25 of the fourth transport section in such a way that the front end (relative to the direction of transport A) of the conveyer belt 26 extends approximately to the center of the conveyer belt 23, while the rear end of this conveyer belt 26 (again relative to the direction of transport A) is disposed beyond the transition zone Ü between the conveyer belts 23 and 24, and in particular approximately in the center of the conveyer belt 24, thus overlapping the transition zone Ü between the conveyer belts 23 and 24. In a similar manner, the conveyer belt 27 overlaps the transition zone Ü between the conveyer belts 24 and 25, while the transition zone Ü between the conveyer belts 27 and 28 is overlapped by the conveyer belt 25, which extends to approximately the center of the conveyer belt 27.

5. A sixth transport section, formed from the conveyer belts 29 and 30, is disposed directly to the side of the fifth transport section formed from the conveyer belts 26-28. One longitudinal side of each of the conveyer belts 29 and 30 is disposed directly adjacent at least one of the conveyer belts 26-28 of the fifth transport section. In the direction of transport A, the conveyer belt 30 follows the conveyer belt 29, with the conveyer belt 30 extending to the outlet 14 of the intermediate transport means 2.

The conveyer belts 29 and 30 of this sixth transport section again have such a length and are offset in the direction of transport A relative to the conveyer belts 26-28 of the fifth transport section in such a way that the front end (relative to the direction of transport A) of the conveyer belt 29 extends to approximately the center of the conveyer belt 26, while the rear end (again relative to the direction of transport A) of this conveyer belt 29 extends beyond the transition zone Ü between the conveyer belts 26 and 27, and in particular extends approximately to the center of the conveyer belt 27, thus overlapping the transition zone Ü between the conveyer belts 26 and 27. In a similar manner, the conveyer belt 30 overlaps the transition zone Ü between the conveyer belts 27 and 28.

6. A seventh transport section, formed from the conveyer belts 31 and 32, is disposed directly to the side of the sixth transport section formed from the conveyer belts 29 and 30. One longitudinal side of each of the conveyer belts 31 and 32 is disposed directly adjacent at least one of the conveyer belts 29 and 30 of the sixth transport section. In the direction of transport A, the conveyer belt 32 follows the conveyer belt 31, with the conveyer belt 32 again extending to the outlet 14 of the intermediate transport means 2.

The conveyer belts 31 and 32 of this seventh transport section have such a length and are offset in the direction of transport A relative to the conveyer belts 29 and 30 of the sixth transport section in such a way that the front end (relative to the direction of transport A) of the conveyer belt 31 extends to approximately the center of the conveyer belt 29, while the rear end (again relative to the direction of transport A) of this conveyer belt 31 extends beyond the transition zone Ü between the conveyer belts 29 and 30, and in particular extends beyond the transition zone by an amount that corresponds approximately to half of the length of the conveyer belt 31, thereby overlapping this transition zone Ü between the conveyer belts 29 and 30. The transition zone between the conveyer belts 31 and 32 is overlapped by the conveyer belt 30.

7. An eighth transport section, formed by the conveyer belt 33, is disposed directly to the side of the seventh transport section formed by the conveyer belts 31 and 32. Just like the conveyer belts 9–13, 15–18, 19–22, 23–25, 26–28, 29, 30, 31, and 32, one longitudinal side of the conveyer belt 33, which is disposed in the direction of transport A, is disposed directly adjacent the conveyer belts 31 and 32 and extends to the outlet 14 of the intermediate transport means 2.

The conveyer belt 33 of this eighth transport section has such a length and is offset relative to the conveyer belts 31 and 32 of the seventh transport section in such a way that the front end (relative to the direction of transport A) of this conveyer belt 33 extends to approximately the center of the conveyer belt 31, with the rear end (again relative to the direction of transport A) of the conveyer belt 33 extending to the outlet 14 of the intermediate transport means 2 thereby overlapping the transition zone Ü between the conveyer belts 31 and 32.

Thus, as described above, the intermediate transport means 2 is provided on each side of the first transport section, which is formed by the conveyer belts 9–13, with seven further transport sections (second to eighth transport sections), whereby relative to the central first transport section (conveyer belts 9–13), in each case the outermost eighth transport section has merely a single conveyer belt 33, the next two more inwardly disposed sixth and seventh transport sections have two conveyer belts, namely the conveyer belts 29 and 30 or 31 and 32, the two further inwardly disposed fourth and fifth transport sections each have three conveyer belts, namely the conveyer belts 23–25 or 26–28, and the two next more inwardly disposed second and third transport sections each have four conveyer belts, namely the conveyer belts 15–18 or 19–22, whereas the central, first transport section has a total of five conveyer belts, namely the conveyer belts 9–13. Thus, in the illustrated embodiment, between the outer eighth transport section (conveyer belt 33) and the inner first transport section (conveyer belts 9–13), each two transport sections that are adjacent one another in a direction perpendicular to the direction of transport A have the same number of conveyer belts, with the number of conveyer belts increasing by one with each second successive transport section in a direction perpendicular to the direction of transport A.

The conveyer belts 9–13, 15–18, 19–22, 23–25, 26–28, 29, 30, 31, 32, and 33, as well as the conveyer belt 5 of the feed mechanism 1 and, in the illustrated embodiment, a total of six conveyer belts 34 that form the withdrawal mechanism 3 and follow one another in the direction perpendicular to the direction of transport A, are continuously rotated and are formed from hinged band chains. Perpendicular to the direction of transport A, the conveyer belts 9–13, 15–18, 19–22, 23–25, 26–28, 29, 30, 31, 32, and 33 each have a width that is considerably less than the diameter of the bases 7' of the bottles 7; in the illustrated embodiment, the width of these conveyer belts is approximately one third of the width of the conveyer belts 5 and 34, the width of which is the same as, or nearly the same as, the diameter of the bases 7' of the bottles 7.

The front and rear ends of the conveyer belts 9–13, 15–18, 19–22, 23–25, 26–28, 29, 30, 31, 32, and 33 are guided over guide wheels or rollers 35 and 36 (FIG. 5), with the upper runs of these conveyer belts, which upper runs move in the direction of transport A, being guided in guide means, which are provided on an apparatus support or frame, in such a way that the upper runs of these conveyer belts form a level, horizontal support surface for the bases 7' of the bottles 7. The similarly level and horizontal support surface of the withdrawal mechanism 3 formed by the upper runs of the conveyer belts 34 then adjoin the aforementioned support surface at the same level at the outlet 14.

In the illustrated embodiment, the aforementioned guide means for the upper runs of the conveyer belts of the intermediate transport means 2 are formed by a number of grooves or slots 38 that are introduced or provided on the upper side (which is disposed in a horizontal plane) of a plastic plate 39 that extends over the entire length and width of the intermediate transport means 2. These slots 38 extend parallel to and at a distance from one another in the direction of transport A. The elements 40 that form the hinge connection between the individual components of the conveyer belts 9–13, 15–18, 19–22, 23–25, 26–28, 29, 30, 31, 32, and 33 that form the intermediate transport means 2 extend from above into the open slots 38, whereas the plate-like portion of the individual components of the conveyer belts rest upon the upper surface of the plate 39 on both sides of each slot 38. This assures in a particularly straightforward manner that each upper run of the conveyer belts that form the intermediate transport means 2 are disposed exactly in a common horizontal plane, thereby forming a completely level support surface for the bottles 7.

Figure 5:
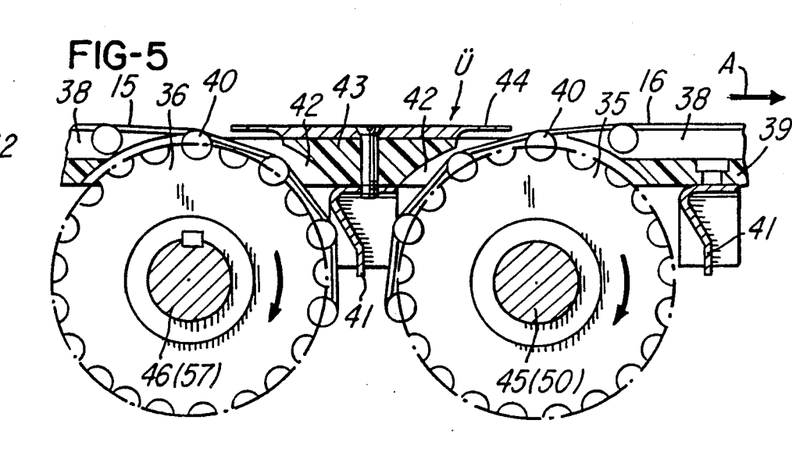
FIG. 5 is a cross-sectional view taken along the line V—V of FIG. 1.
Figure 6:
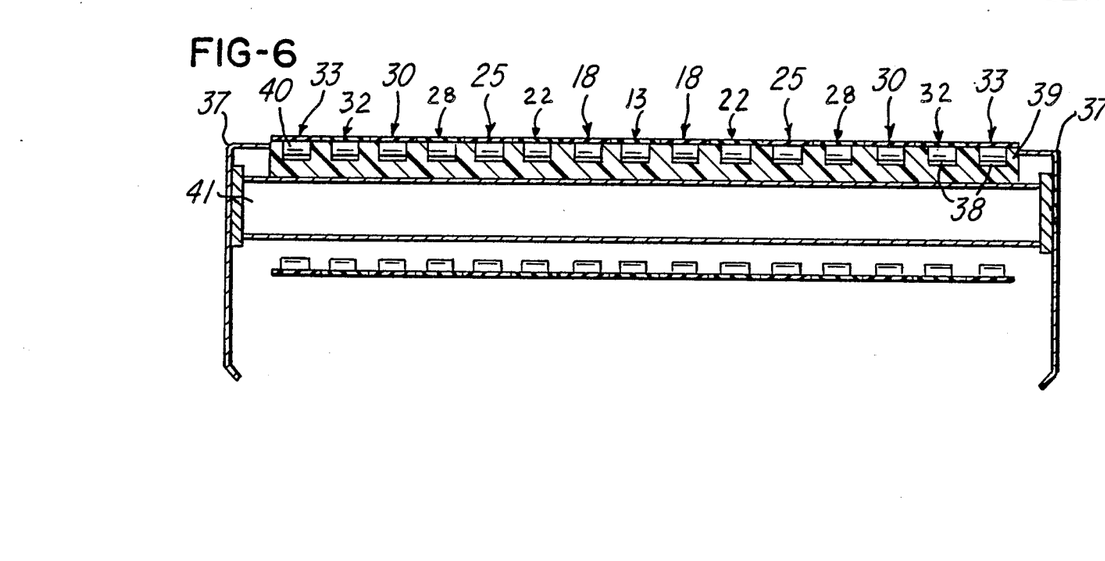
FIG. 6 is a cross-sectional view taken along the line VI—VI of FIG. 1.

The underside of the plate 39 rests upon a plurality of crosspieces 41 that extend in a horizontal direction at right angles to the direction of transport A. The plate 39 is secured to these crosspieces 41 and hence to the apparatus support frame 37. As shown in FIG. 5, through openings 42 are provided or milled in the plate 39 at both the beginning as well as the end of the individual conveyer belts that form the intermediate transport means 2, i.e. at those locations where these conveyer belts are guided over the guide rollers 35 and 36. In a direction perpendicular to the direction of transport A, the width of the openings 42 is the same as or slightly greater than the width of the conveyer belts that form the intermediate transport means 2.

The arrangement or distribution of the crosspieces 41 is such that a crosspiece 41 is also disposed at each transition zone Ü between two conveyer belts of the intermediate transport means 2 that are disposed one after the other in the direction of transport A, in other words, also at the transition zone Ü illustrated in FIG. 5 between the conveyer belts 15 and 16, i.e. between the guide wheels 35 and 36 disposed at that location. Via a spacer 43, a glide plate 44 that bridges the transition zone Ü is then provided on the crosspiece 41 for the bases 7' of the bottles 7. In this connection, the upper surface of each glide plate 44 is essentially disposed at the same level as the plane or support surface formed by the upper runs of the conveyer belts of the intermediate transport means 2. The openings 42 for the guide wheels 35 and 36 could also be disposed in the plate 39 in such a way that the spacers 43 are formed by strips of material of the plate 39 that remain when the openings 42 are formed.

Each of the guide rollers 35 that form the front end of the conveyer belts of the intermediate transport means 2 is mounted in a freely rotatable manner on the apparatus support frame 37 on a shaft 45 about a horizontal axis that extends at right angles to the direction of transport A. Each of the guide rollers 36 that forms the rear end of the conveyer belts of the intermediate transport means 2 is drivingly connected with a shaft 46, the axis of which similarly extends in a horizontal direction and at right angles to the direction of transport A. The shafts 46 are mounted on the apparatus support frame 37, and are rotated in a manner that will be described subsequently.

In the embodiment illustrated in FIG. 1, the axes for the front ends of the conveyer belts of the intermediate transport means 2, i.e. for the shafts 45 or guide wheels 35 at that location, are designated by the reference numerals 47-55, with these axes being disposed and being associated with the individual conveyer belts as follows:

Axis 47:

This axis delimits the front end of the conveyer belt 9 and is disposed at the end of the feed mechanism 1 ahead of (in the direction of transport A) the connecting zone 8, i.e. ahead of that region where the guide rails 6 have the S-shaped path 6'.

Axis 48:

This axis delimits the front end of the conveyer belts 15 of the two second transport sections, and is disposed, in the direction of transport A, after the entrance of the intermediate transport means 2 and ahead of the transition zone Ü between the conveyer belts 9 and 10.

Axis 49:

This axis 49, which follows the axis 48 in the direction of transport A, delimits the front end of the conveyer belt 10 of the first transport section as well as the conveyer belts 19 of the two third transport sections, and in the direction of transport A is disposed after the transition zone Ü between the conveyer belts 9 and 10 and ahead of the transition zone Ü between the conveyer belts 15 and 16 of the two second transport sections.

Axis 50:

This axis 50, which follows the axis 49 in the direction of transport A, determines the front end of the conveyer belts 16 of the two second transport sections as well as the front end of the conveyer belts 23 of the two fourth transport sections, and is disposed, in the direction of transport A, after the transition zone between the conveyer belts 15 and 16 and ahead of the transition zone Ü of the conveyer belts 10 and 11 and 19 and 20.

Axis 51:

This axis 51, which follows the axis 50 in the direction of transport A, delimits the front end of the conveyer belt 11, the conveyer belts 20 of the two third transport sections, as well as the conveyer belts 26 of the two fifth transport sections, and is disposed, in the direction of transport A, after the three transition zones between the conveyer belts 10 and 11 and between the conveyer belts 19 and 20, and ahead of the four transition zones Ü between the conveyer belts 16 and 17 and 23 and 24.

Axis 52:

This axis 52, which follows the axis 51 in the direction of transport A, delimits the front end of the conveyer belts 17 of the two second transport sections as well as of the conveyer belts 24 of the two fourth transport sections, and is disposed, in the direction of transport A, after the four transition zones Ü between the conveyer belts 16 and 17 and between the conveyer belts 23 and 24, and ahead of the five transition zones Ü between the conveyer belts 11 and 12, 20 and 21, and 26 and 27.

Axis 53:

This axis 53, which follows the axis 52 in the direction of transport A, delimits the front end of the conveyer belt 12 of the first transport section, the front end of the conveyer belts 21 of the two third transport sections, the front ends of the conveyer belts 27 of the two fifth transport sections, as well as the front ends of the conveyer belts 31 of the two seventh transport sections, and is disposed, in the direction of transport A, after the five transition zones Ü between the conveyer belts 11 and 12, 20 and 21, and 26 and 27, and ahead of the total of six transition zones Ü between the conveyer belts 17 and 18, 24 and 25, and 29 and 30.

Axis 54:

This axis 54, which follows the axis 53 in the direction of transport A, delimits the front end of the conveyer belts 18 of the two second transport sections, the front end of the conveyer belts 25 of the two fourth transport sections, the front end of the conveyer belts 30 of the two sixth transport sections, as well as the front end of the conveyer belts 33 of the two eighth transport sections, and is disposed, in the direction of transport A, after the transition zones Ü between the conveyer belts 17 and 18, 24 and 25, and 29 and 30, and ahead of the total of seven transition zones Ü between the conveyer belts 12 and 13, 21 and 22, 27 and 28, and 31 and 32.

Axis 55:

This axis 55, which follows the axis 54 in the direction of transport A, delimits the front end of the conveyer belt 13 of the first transport section, the front end of the conveyer belts 22 of the two third transport sections, the front end of the conveyer belts 28 of the two fifth transport sections, as well as the front end of the conveyer belts 32 of the two seventh transport sections, and is disposed, in the direction of transport A, after the transition zones Ü between the conveyer belts 12 and 13, 21 and 22, 27 and 28, and 31 and 32.

The driven axes that correspond to the rear ends of the conveyer belts of the intermediate transport means, i.e. the shafts 46, are designated in FIG. 1 with the reference numerals 56-63, with the following arrangement and association being applicable:

Axis 56:

This axis 56 delimits the rear end of the conveyer belt 9 and is disposed, in the direction of transport A, after the axis 48 and ahead of the axis 49.

Axis 57:

This axis 57, which follows the axis 56 in the direction of transport A, delimits the rear end of the conveyer belts 15 of the two second transport sections, and is disposed, in the direction of transport A, after the axis 49 and ahead of the axis 50.

Axis 58:

This axis 58, which follows the axis 57 in the direction of transport A, delimits the rear end of the conveyer belt 10 of the first transport section and the rear end of the conveyer belts 19 of the two third transport sections, and is disposed, in the direction of transport A, after the axis 50 and ahead of the axis 51.

Axis 59:

This axis 59, which follows the axis 58 in the direction of transport A, delimits the rear end of the conveyer belt 16 of the two second transport sections as well as the rear end of the conveyer belts 23 of the two fourth transport sections, and is disposed, in the direction of transport A, after the axis 51 and ahead of the axis 52.

Axis 60:

This axis 60, which follows the axis 59 in the direction of transport A, delimits the rear end of the conveyer belt 11 of the first transport section, the rear end of the conveyer belts 20 of the two third transport sections, as well as the rear end of the conveyer belts 26 of the two fifth transport sections, and is disposed, in the direction of transport A, after the axis 52 and ahead of the axis 53.

Axis 61:

This axis 61, which follows the axis 60 in the direction of transport A, delimits the rear end of the conveyer belts 17 of the two second transport sections, the rear end of the conveyer belts 24 of the two fourth transport sections, as well as the rear end of the conveyer belts 29 of the two sixth transport sections, and is disposed, in the direction of transport A, after the axis 53 and ahead of the axis 54.

Axis 62:

This axis 62, which follows the axis 61 in the direction of transport A, delimits the rear end of the conveyer belt 12 of the first transport section, the rear end of the conveyer belts 21 of the two third transport sections, the rear end of the conveyer belts 27 of the two fifth transport sections, as well as the rear end of the conveyer belts 31 of the two seventh transport sections, and is disposed, in the direction of transport A, after the axis 54 and ahead of the axis 55.

Axis 63:

This axis 63, which follows the axis 62 in the direction of transport A, is disposed in the vicinity of the outlet 14 of the intermediate transport means 2 and hence delimits the rear ends of the conveyer belts 13, 18, 22, 25, 28, 30, 32, and 33 of all of the transport sections located in that vicinity.

As furthermore shown in the embodiment illustrated in FIG. 1, with the exception of the conveyer belt 9, all of the conveyer belts 10–12, 15–17, 19–21, 23, 24, 26, 27, 29, and 31 that do not extend to the outlet 14 have the same length. Of those conveyer belts 13, 18, 22, 25, 28, 30, 32, and 33 that do extend to the outlet 14, the conveyer belts 13, 22, 28, and 32 each have the same first length, which in this embodiment corresponds to the length of the aforementioned conveyer belts that do not extend to the outlet 14, while the conveyer belts 18, 25, 30, and 33 similarly have the same second length, which however is greater than the aforementioned first length by half of the length of the conveyer belts 10–12, 15–17, 19–21, 23, 24, 26, 27, 29, and 31 that do not extend to the outlet 14. As a result, and also due to the fact that the conveyer belts in the individual transport sections follow one another in the direction of transport A, the previously described overlapping of the transition zones Ü results from the respective lateral abutment of the conveyer belts and the previously described offset of the conveyer belts that form the intermediate transport means 2.

As shown in FIG. 1, the axis 56 is driven by an electric motor 64, the speed of which can be regulated. The drive of the axes 57–59 is effected from the axis 56 and then from axis to axis, in each case via a reduction gearing 65, so that in the same way that the axes 56–59 follow one another in the direction of transport A, their speed is also reduced.

In a similar manner, the axis 60 is driven by a second electric motor 66, the speed of which can be regulated. The drive of the axes 61–63 is effected from the axis 60, and then from axis to axis via a reduction gearing 67. In the same manner that the axes 60–63 follow one another in the direction of transport A, their speed thus also is reduced in stages. In a practical application, the two electric motors 64 and 66 are controlled by a control mechanism 68 as a function of the throughput capacity of a processing machine, for example a labelling machine, packer, etc., that follows the withdrawal mechanism 3. In particular, the electric motors 64 and 66 are controlled in such a way that the transport speed of those conveyer belts of the intermediate transport means 2 that extend to the outlet 14 are the same as the conveying speed of the withdrawal mechanism 3. Furthermore, the normal speed of the electric motor 66 is such that also the axis 60 has a lower speed than does the axis 59, so that in the same way that the axes 56–63 follow one another in the direction of transport A, the speed of all of the axes 56–63 is reduced in stages.

As a result of the described association of the axes 56–63 with the individual conveyer belts of the intermediate transport means 2, at each transition zone Ü between the conveyer belts of the intermediate transport means 2, the difference of the transport speeds between a preceding and a following conveyer belt in the direction of transport A is greater than the difference of the transport speeds between this preceding conveyer belt and a conveyer belt of an adjacent transport section that overlaps the transition zone Ü. In the illustrated embodiment, the transport speeds are such that the difference of the transport speeds between two adjacent conveyer belts perpendicular to the direction of transport A is 10 meters/minute.

As a result of the described arrangement, whereby due to the narrow width of the conveyer belts that form the intermediate transport means 2, the bases 7' of the bottles 7 always stand upright on several conveyer belts at the same time, a uniform and gradual slowing down of the stream of bottles conveyed by the feed mechanism 1 is achieved. This stream of bottles is deflected not by external forces, such as railings or the like, but rather the supplied stream of bottles increasingly expands automatically in width (transverse to the direction of transport A). A bumping together of the bottles 7 during conversion of the single-row stream of bottles into the six-row stream of bottles is also effected continuously at a low speed differential, whereby a jamming or backup due to the glide plates 44 is avoided due to the narrow width of the conveyer belts that form the intermediate transport means 2, as well as due to the offset of these conveyer belts, i.e. of the transition zones Ü.

As shown in FIG. 1, the withdrawal mechanism 3, the track width of which corresponds to the track width of the intermediate transport means 2 at the outlet 14, is provided with two side guide rails 69 that also extend to the entrance of the intermediate transport means 2, where they merge with the guide rails 6.

Figure 2:
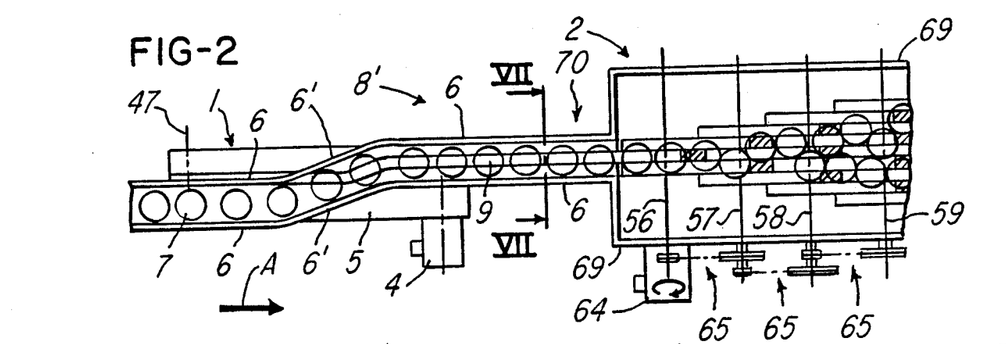
FIG. 2 is a view similar to that of FIG. 1 showing the connecting zone between the feed mechanism and the intermediate transport means of a modified exemplary embodiment of the inventive arrangement.
Figure 7:
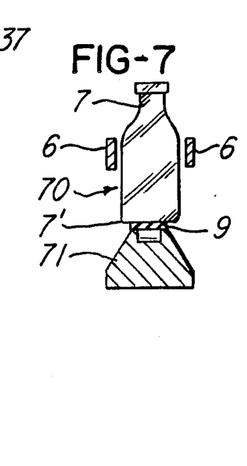
FIG. 7 is a cross-sectional view taken along the line VII—VII through the connecting zone of the arrangement of FIG. 2, together with one bottle.

FIG. 2 shows an embodiment that essentially differs from the embodiment of FIG. 1 only in that the connecting zone 8' between the feed mechanism 1 and the intermediate transport means 2, following in the direction of transport A a portion that is defined by the S-shaped part 6' of the guide rails 6, has a linearly extending transport section 70 that is formed from only a part of the length of the conveyer belt 9 and the two guide rails 6. In this transport section 70, the respectively upper run of the conveyer belt 9 is guided in a guide groove provided on the upper side of a guide bar 71. As shown in FIG. 7, the guide bar 71, its longitudinal dimension of which is disposed in the direction of transport A, has an approximately trapezoidal cross-sectional shape, with the width of this guide bar 71 increasing from the upper side to the lower side thereof. The transport section 70 has the advantage that only upright bottles 7 can pass from the feed mechanism 1 to the intermediate transport means 2, since only those bottles 7 that have their bases 7' standing on the conveyer belt 9 are at the same time also guided by the two guide rails 6 that are disposed beyond the level of the conveyer belt 9. For example, bottles 7 that have fallen over, or bottle fragments, which can then not be guided by the two guide rails 6, fall from the conveyer belt 9 in the region of the transport section 7 and are thus automatically discharged. To enhance this effect, in a region of the transport section 70 the upper run of the conveyer belt 9 is preferably provided with a slight inclination relative to the horizontal axial direction that extends at right angles to the direction of transport A.

Figure 3:
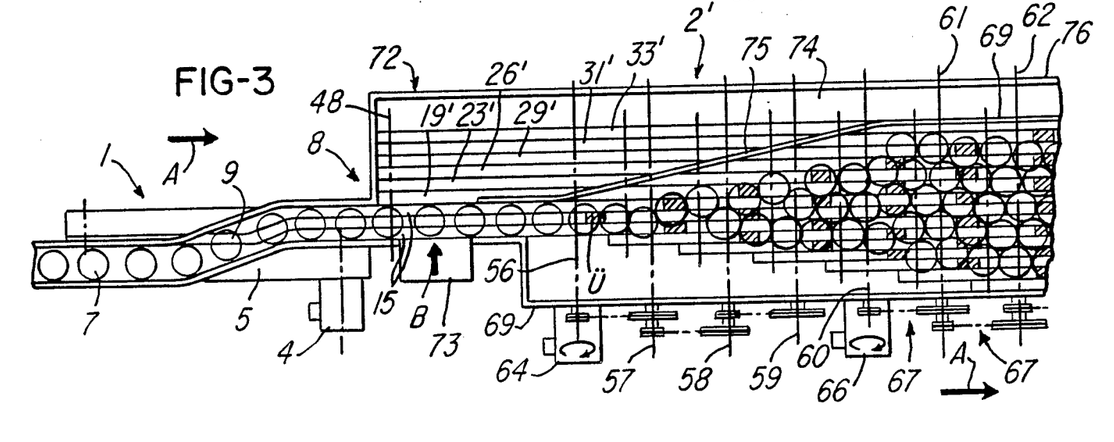
FIG. 3 is a view similar to that of FIG. 1 showing the feed mechanism as well as a portion of the intermediate transport means of a further exemplary embodiment of the inventive arrangement.
Figure 4:
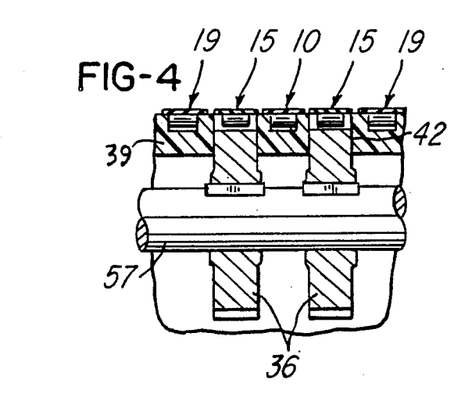
FIG. 4 is a cross-sectional view taken along the line IV—IV of FIG. 1.

The embodiment illustrated in FIG. 3 differs essentially from the embodiment of FIG. 1 only in that following the connecting zone 8, i.e. the entrance of the intermediate transport means 2', and prior to the actual conversion region in the direction of transport A, which conversion region begins approximately at the transition zone Ü between the conveyer belts 9 and 10 of the first transport section, the intermediate transport means 2' is provided with a zone or region 72 having an ejection mechanism 73 which serves, for example, to eject or discharge bottles that have not been orderly processed in the preceding processing station (for example underfilled bottles, not properly filled bottles, etc.). With this embodiment, the zone 72 is formed not only by the conveyer belt 9 and the conveyer belts 15 of the two second transport sections that extend to the entrance of the intermediate transport means 2', but also from the forward (relative to the direction of transport A) conveyer belts of the third to eighth transport sections provided on one side of the conveyer belt 9, i.e. the pertaining first transport section (in the illustration selected for FIG. 3, above this first transport section). These conveyer belts are designated 19', 23', 26', 29', 31', and 33' in FIG. 3. Their function corresponds to that of the conveyer belts 19, 23, 26, 29, 31, and 33, and they differ from the latter merely in that their forward end similarly extends to that side of the intermediate transport means 2' that is adjacent the feed mechanism 1. Following to the outside of the conveyer belt 33' is an additional conveyer belt 74, which together with an external guide rail 76 forms a conveying stretch for removing the bottles 7 ejected by the mechanism 73. The front end of the conveyer belt 74, relative to the direction of transport A, i.e. the corresponding direction-changing region is, just like the direction-changing regions of the conveyer belts 15, 19', 23', 26', 29', 31', and 33', delimited by the axis 48. In order to assure that bottles 7 that are ejected by the mechanism 73, i.e. are moved by this mechanism in the direction of the arrow B perpendicular to the direction of transport A by the conveyer belts 9 and 15 onto the conveyer belts 19', 23', 26', 29', 31', and 33', and are moved away by these conveyer belts, and finally onto the conveyer belt 72 and cannot pass into the stream of bottles conveyed to the withdrawal mechanism 3, this embodiment is furthermore provided with a guide rail 75, one end of which is disposed in the zone 72 after the entrance of the intermediate transport means 2' (in the direction of transport A) and approximately against that side of the conveyer belt 19' that is adjacent the conveyer belt 15; the other end of the guide rail 75, which follows in the direction of transport A, merges into the upper guide rail 69 shown in FIG. 3. This guide rail 75 serves exclusively for the previously described removal of bottles and not for the conversion of the stream of bottles. The previously described removal of bottles in the region of the intermediate transport means 2' is possible only because the conversion is effected without the necessity of guide rails.

The present invention has been described with the aid of specific embodiments. However, it is to be understood that changes and modifications are possible without thereby deviating from the basic concept of the present invention. Thus, for example, it is possible to drive all of the axes 56–63 with a common motor and appropriate reduction gearing, although the use of two electric motors 64 and 66 offers the advantage for being able to optimally control the conversion process.

Pursuant to the present invention, the transport elements that form the transport sections of the intermediate transport means and that rotate in a common direction of transport, i.e. have a common direction of transport, can also respectively comprise a group of rollers that in each group follow one another in the direction of transport, and from group to group are driven at a different speed about a horizontal axis that is disposed perpendicular to the direction of transport. Pursuant to one possible exemplary arrangement of this embodiment of the invention, the conveyer belts of the intermediate transport means 2 or 2' could respectively be replaced by at least one such group of rollers, whereby then at the transition zones Ü the corresponding glide plates 44 could be eliminated.

The present invention is, of course, in no way restricted to the specific disclosure of the specification and drawings, but also encompasses any modifications within the scope of the appended claims.

What I claim is:

1. In a method of converting a single-row stream of containers, which stream is supplied via a feed mechanism, into a multi-row stream of containers that is to be withdrawn, with said method utilizing a conversion region formed from an intermediate transport means that is disposed between said feed mechanism and a withdrawal mechanism, and comprises a number of conveying means including plural conveyors one after the other having a direction of conveyance and having a common direction of transport with the transport speed of said containers in said conversion region being reduced in stages while the width of said stream of containers is increasing, the improvement in combination therewith comprising the steps of:

moving said containers through said conversion region free of any lateral incline in the conversion region and in said direction of transport of said conveying means being maintained therewith; and reducing the transport speed of said containers in each row by stages gradually as well as reducing in said direction of transport thereof by said conveying means along the plural conveyors laterally of infeed plus a section longitudinally of each of those conveyors accompanied by decrease in speed in direction of conveyance so as to reduce speed both laterally and longitudinally.

2. In an arrangement for converting a single-row stream of containers, which stream is supplied via a feed mechanism, into a multi-row stream of containers, which is to be withdrawn via a withdrawal mechanism that has a transport speed that is less than the transport speed of said feed mechanism, said arrangement including an intermediate transport means that is disposed between said feed mechanism and said withdrawal mechanism and forms a conversion region for said conversion of said single-row stream of containers into said multi-row stream of containers, with said intermediate transport means having an entrance that follows either said feed mechanism or a connecting zone that is disposed between said feed mechanism and said intermediate transport means, and with said intermediate transport means also having an outlet to which said withdrawal mechanism is connected, said intermediate transport means being provided with a number of transport sections on which bases of said containers stand, with said transport sections being formed from continuous rotating conveyer belts which, relative to their direction of rotation or transport, each have an upstream end, which is delimited by a respective direction-changing means at that location, and also have a downstream end, which is similarly delimited by a respective direction-changing means, whereby at least a first transport section forms said entrance of said intermediate transport means, said upstream and downstream ends of said conveyer belts of said transport sections are offset relative to one another in said direction of transport of said conveyer belts, said transport sections laterally abut one another in a direction transverse to said direction of transport, and said conveyer belts of said transport sections have different rotational or transport speeds in order to bridge, in stages, the difference between the transport speeds of said feed mechanism and said withdrawal mechanism, the improvement wherein:

all of said transport sections have a conveyer belt that extends to said outlet of said intermediate transport means;

said first transport section, as well as further transport sections disposed laterally of said first transport section, with the exception, on each side of said first transport section, of the outermost transport section, each have at least two conveyer belts that in a given transport section follow one another in said direction of transport via the interposition of respective transition zones;

at least in said conversion region of said intermediate transport means, that conveyer belt that follows a transition zone of a given transport section in said direction of transport has a lower transport speed than does that conveyer belt of this transport section that immediately precedes this transition zone in said direction of transport;

at least in said conversion region of said intermediate transport means, disposed adjacent to each transition zone of one transport section is a conveyer belt of a laterally abutting transport section, with this conveyer belt overlapping this transition zone; and the width of each of said conveyer belts that form said transport sections of said intermediate transport means, as measured at right angles to said direction of transport, is less than the diameter of said bases of said containers.

3. An arrangement according to claim 2, in which said conveyer belt, of said laterally abutting transport section, that overlaps said transition zone has a transport speed that is less than the transport speed of that conveyer belt that immediately precedes this transition zone in said direction of transport.

4. An arrangement according to claim 3, in which said conveyer belt, of said laterally abutting transport section, that overlaps said transition zone has a transport speed that is greater than the transport speed of that conveyer belt that follows this transition zone in said direction of transport.

5. An arrangement according to claim 2, which includes a number of further transport sections on each side of said first transport section.

6. An arrangement according to claim 5, in which said conveyer belts of said further transport sections are disposed symmetrically relative to a center line of said intermediate transport means defined by said direction of transport of said conveyer belts of said first transport section.

7. An arrangement according to claim 2, in which said transition zones between said conveyer belts of a given transport section are offset, in said direction of transport, from said transition zones of the adjacent transport section.

8. An arrangement according to claim 2, in which said conveyer belts that extend to said outlet of said intermediate transport means each differ in length, in said direction of transport, from one transport section to the next such that said upstream ends of adjacent ones of said conveyer belts are offset from one another in said direction of transport.

9. An arrangement according to claim 2, in which said upstream and downstream ends of said conveyer belts are delimited by a number of horizontally disposed axes that follow one another in said direction of transport and extend perpendicular to said direction of transport.

10. An arrangement according to claim 9, in which the upstream and downstream ends of those conveyer belts that are provided in an overlapping manner on opposite sides of a transition zone of a given transport section are respectively delimited by a common axis.

11. An arrangement according to claim 10, in which said downstream ends of said conveyer belts that extend to said outlet of said intermediate transport means are delimited by a single common horizontally extending axis that is disposed perpendicular to said direction of transport and is preferably driven.

12. An arrangement according to claim 9, in which said axes that delimit said downstream ends of said conveyer belts are driven, in the manner in which they follow one another in said direction of transport, with a speed that decreases in stages, whereby the difference in transport speed between conveyer belts driven by two successive ones of said axes is preferably approximately 10 meters/minute.

13. An arrangement according to claim 12, in which said axes form two groups of axes that follow one another in said direction of transport, with a separate drive motor, the speed of which can preferably be regulated, being provided for each of said groups of axes.

14. An arrangement according to claim 2, which includes seven further transport sections on each side of said first transport section.

15. An arrangement according to claim 2, in which each of said conveyer belts that form said transport sections of said intermediate transport means have a width of approximately one third of the diameter of said bases of said containers.

16. An arrangement according to claim 2, which includes, between said feed mechanism and said intermediate transport means, a connecting zone that is provided with a transport section for removing foreign objects, especially container fragments, with this transport section comprising a conveyer belt and two side guide rails that are disposed higher than this conveyer belt, which is preferably tilted to the side and/or has a width that is less than that of the diameter of said bases of said containers.

17. An arrangement according to claim 2, in which each of said transition zones is provided with a glide plate.

18. An arrangement according to claim 2, which includes at least one plate that has a level, horizontally disposed upper surface that is provided with slots in which are guided upper runs of said conveyer belts that form said intermediate transport means.

* * * * *